June 16, 1936.  M. KLEIN ET AL  2,044,005
HIGH PRESSURE GAUGE
Filed Aug. 21, 1930  3 Sheets-Sheet 1
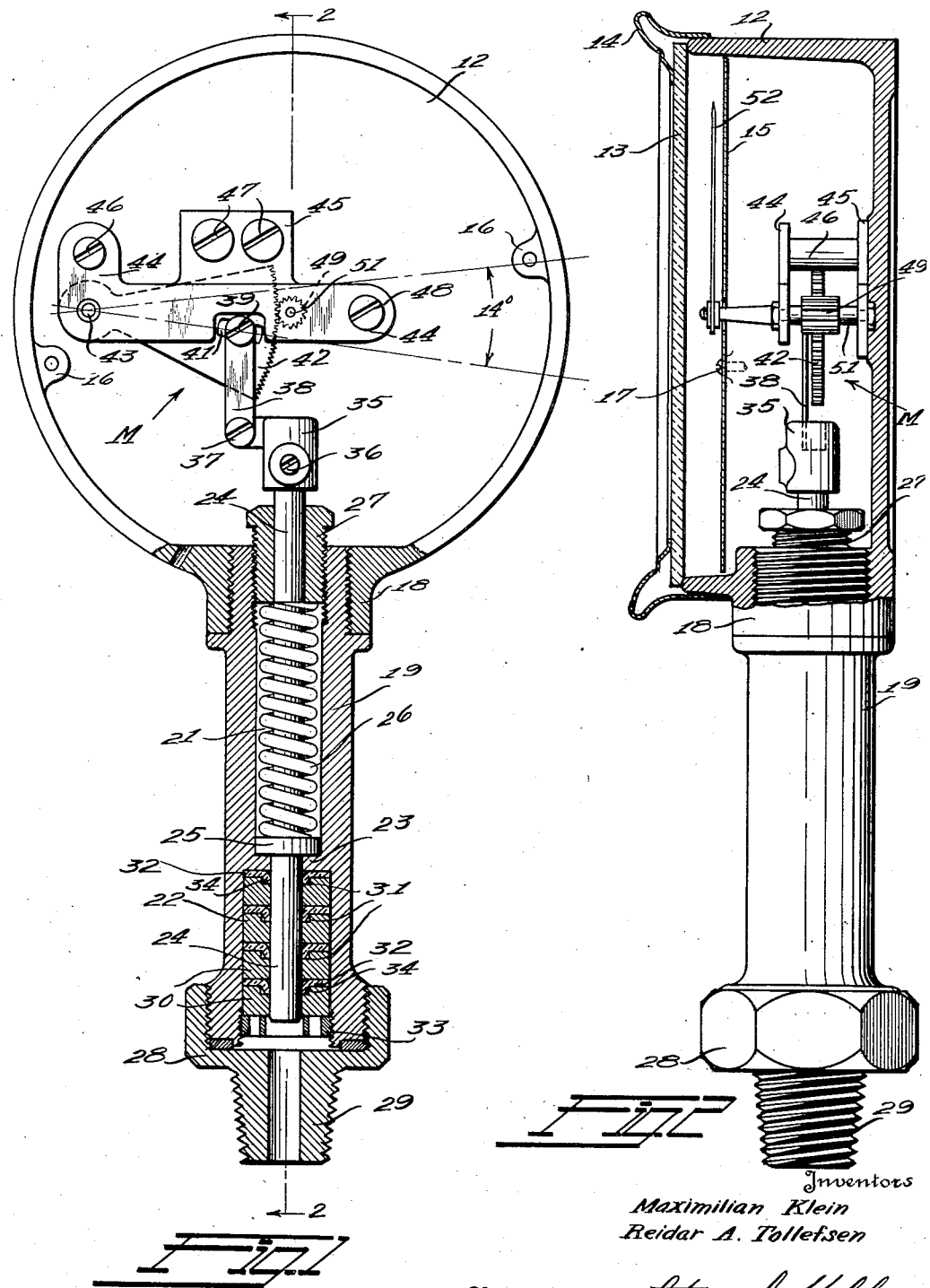
Inventors
Maximilian Klein
Reidar A. Tollefsen
By Strauch & Hoffman
Attorneys

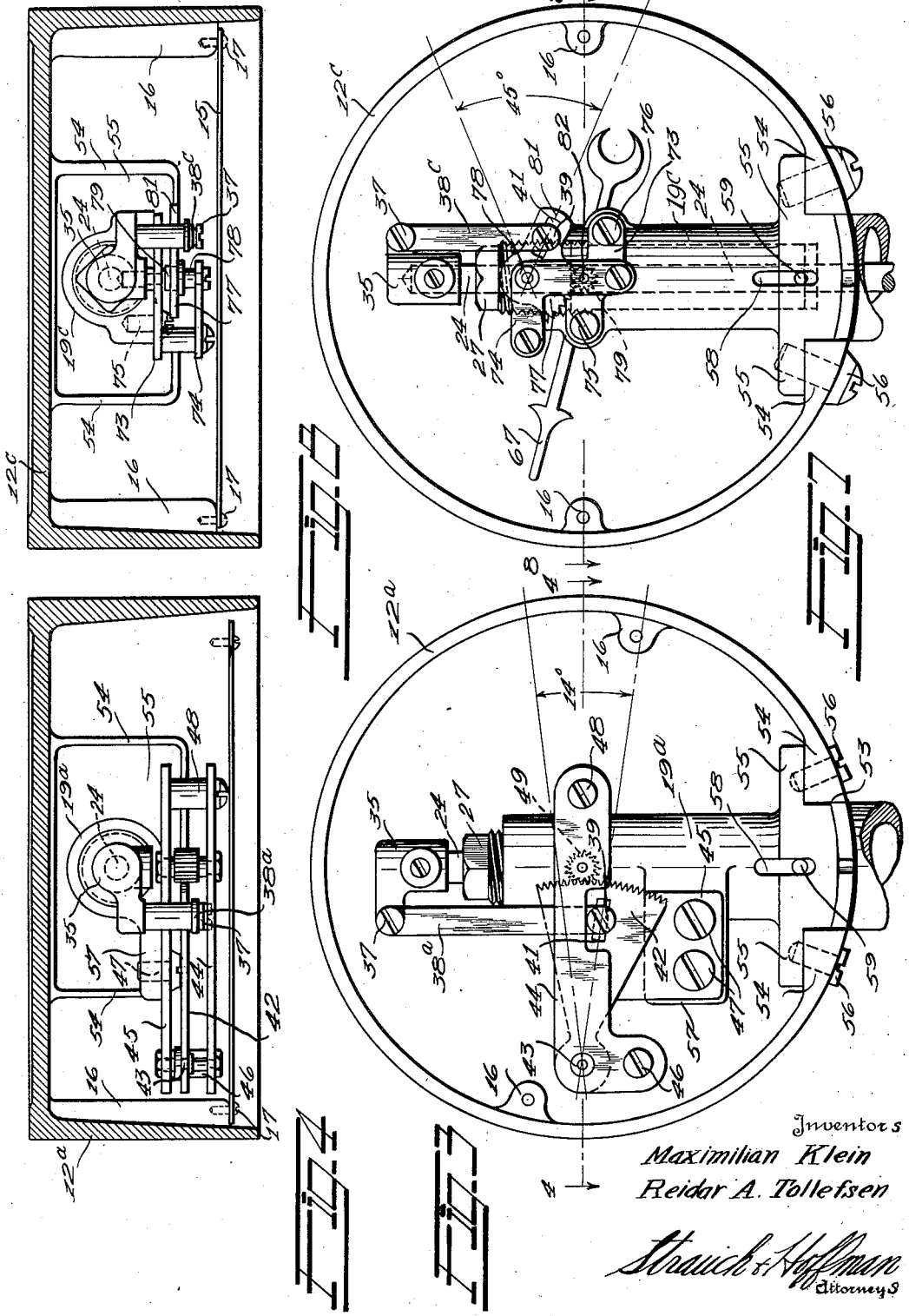

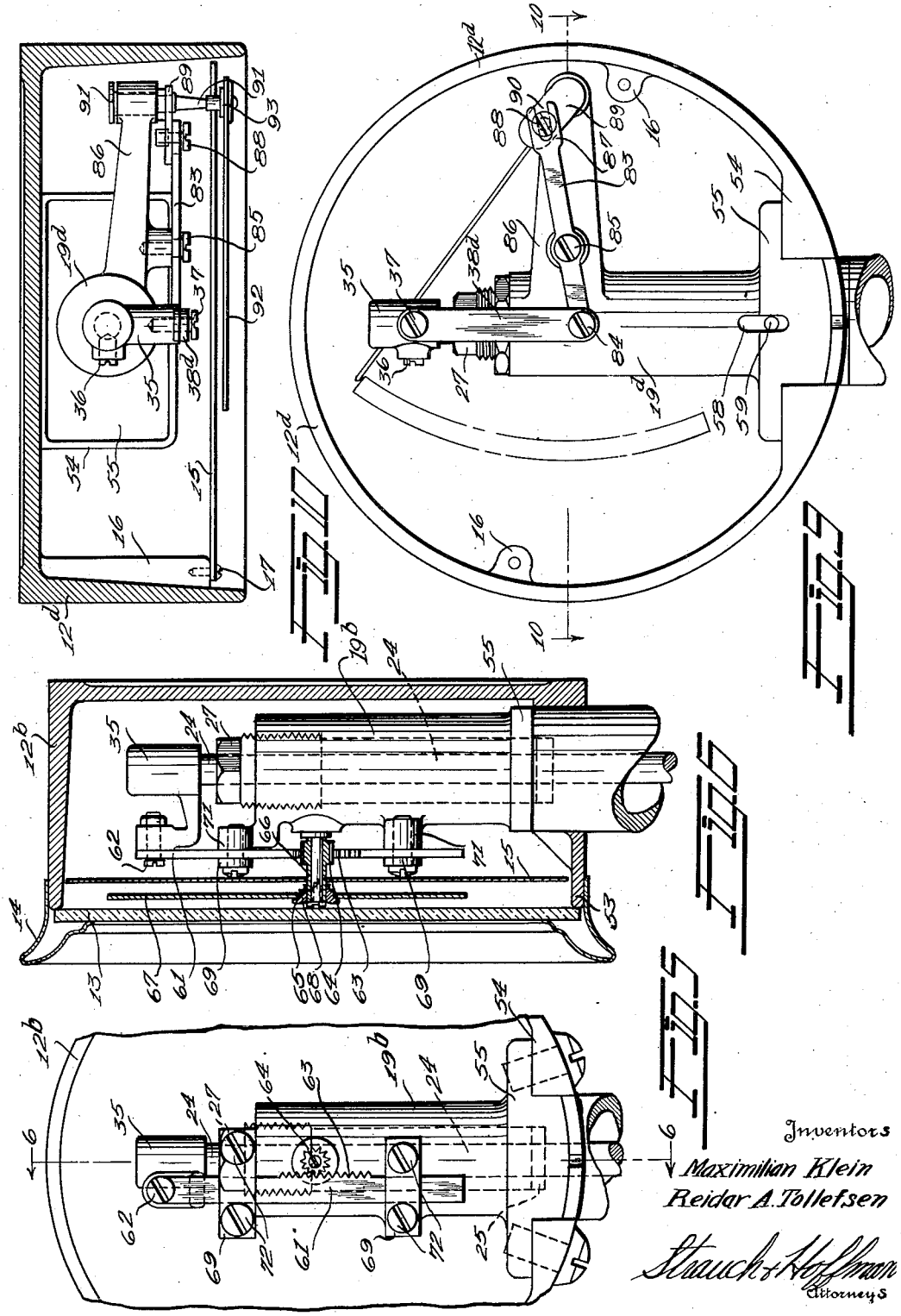

Patented June 16, 1936

2,044,005

UNITED STATES PATENT OFFICE 2,044,005

HIGH PRESSURE GAUGE

Maximilian Klein and Reidar Anker Tollefsen, Sellersville, Pa., assignors to United States Gauge Company, New York, N. Y., a corporation of Pennsylvania Application August 21, 1930, Serial No. 476,906

8 Claims. (Cl. 73—111)

This invention relates to pressure gauges, particularly those of the plunger type for indicating relatively high pressures.

When pressure gauges are utilized in connection with broaching machines, presses and the like they are subjected to heavy pulsations and vibrations. The conventional gauges at present on the market are not satisfactory for such purposes, since the heavy pulsations under high pressure frequently cause distortion of the movement to render the readings inaccurate, and often damage the instrument so as to render it wholly inoperative. The average life of a gauge of the Bourdon tube type, when applied to broaching machines and the like, is approximately two hours.

Accordingly, it is the primary object of the present invention to provide a pressure gauge which will maintain its accuracy under all conditions of service and which will withstand heavy pulsations and vibrations throughout a period of long life without damage to any of the operating parts of the instrument.

More specifically stated, it is a primary object of this invention to provide a gauge embodying a small plunger having one of its ends exposed to fluid pressure and means for yieldingly resisting reciprocation of the plunger in response to the pressure. In this connection, further major objects of the invention are to devise means for effectively sealing the plunger against leakage along its cylindrical surface while permitting free reciprocation of the plunger through the sealing means; and to provide a device within the instrument for guiding the plunger, and for varying the resistance opposing the plunger movement, whereby the instrument may be adjusted for adaptation to various uses and pressures and an approximate predetermined stroke may be selected for the plunger.

Another object of our invention is to provide, in a pressure gauge, a novel and simple leak-indicating means from which it can readily be detected that adjustment or repairs must be made. In the illustrated embodiments of this invention leakage would merely indicate that the packing needed tightening. The leak-indicating means preferably is utilized to form part of a device for preventing rotation of the plunger.

Further objects of the present invention are to provide accurate and substantially shock-proof movements for actuating an indicating pointer. Some of the illustrated movements are of the gear type involving arcuate segments or rack and pinion, and others are of a direct non-gear type. Preferably, the movements are designed so that the segments or linkage parts swing in arcs that are relatively short compared to the arcuate ranges of the pointers. In some instances it is preferable to pivot the pointers centrally of the casing in order that a long scale may be applied to the dial to obtain maximum accuracy in sight readings.

Another important object is that of combining the pressure-responsive device (the plunger and its appurtenances) with the movement, dial and pointer to form an assembled structure that may be inserted in, and removed from, the casing as a unit.

Other objects will appear from a study of the following detailed description and appended claims when taken in connection with the accompanying drawings, wherein:

Figure 1 is a view, partly in front elevation and partially in vertical section, of one form of gauge constructed in accordance with the present invention. The bezel, glass, dial and pointer are removed for clarity of illustration.

Figure 2 represents a partial sectional view taken on the plane indicated by line 2—2 in Figure 1.

Figure 3 is a view, similar to Figure 1, of a modified and preferred embodiment of the invention.

Figure 4 is a view in horizontal section, taken substantially on the plane of line 4—4, Figure 3, with the movement shown in plan.

Figure 5, which discloses a further modification that also constitutes a preferred form, is a view similar to Figure 3 with a different type of movement substituted for that of Figure 3.

Figure 6 is a vertical sectional view taken on the plane of line 6—6, Figure 5.

Figure 7 shows, in a view like that of Figures 3 and 5, a still further modification embodying a movement of another different design.

Figure 8 represents a horizontal section taken substantially upon the plane of line 8—8 in Figure 7.

Figure 9 discloses, in a view corresponding with Figures 3, 5, and 7, still another modified form wherein a gearless movement is utilized.

Figure 10 constitutes a horizontal sectional view as seen when looking toward the plane of line 10—10, Figure 9.

With further reference to the drawings, wherein like numerals are employed to designate like parts, and with particular reference to Figures 1 and 2:

Numeral 12 designates a cup-shaped instrument casing having a glass 13 positioned against its rim by a bezel 14. Visible through the glass is a dial 15 attached to a pair of casing bosses 16 by screws 17. A movement M is mounted behind the dial and designed to be actuated by the following pressure-responsive mechanism:

The casing 12 is provided with an internally threaded extension 18 which is adapted to receive the upper externally threaded end of a housing sleeve 19. This sleeve is open from end to end to form an upper spring chamber 21 and a lower packing chamber 22 separated by an annular abutment 23. A plunger 24 of relatively small diameter extends into both chambers and is provided with a collar 25 resting upon the annular abutment 23. A coil spring 26 surrounds the upper end of the plunger and is forced into compression against the collar 25 by a combined guiding and adjusting bushing 27 screwed into the upper end of chamber 21. A reducing bushing 28 is screwed upon the lower end of sleeve 19 to provide a nipple 29 for connection with a source of fluid pressure, the lower end of the plunger 24 thereby being subjected to the pressure to be measured. In order to prevent the fluid from escaping past the plunger and leaking into the chamber 21 and the casing 12, a special sealing means is provided as follows:

A plurality of packing elements are fitted within the chamber 22 in superposed relation to surround the plunger. Each element comprises a metal ring 30 (preferably brass) having an annular recess 31 in its top side immediately adjacent its bore, and a non-metallic packing disc 32 (preferably of Morocco leather) upon the upper surface of the ring. The leather discs 32 have glazed upper surfaces and their original inner diameters are less than those of the rings and the plunger. The packing is assembled and operated on prior to the insertion of the plunger. The packing elements having been arranged in superposed relation they are forced upwardly against the abutment 23 by an adjusting nut 33 that is screwed into the lower end of the sleeve. A paper drill is then inserted in the upper end of the sleeve and run through the aligned central openings of the packing elements, as a result of which operation the inner edges of the leather discs are gradually forced downwardly, as at 34, into the recesses 31 until a smooth internal packing bore is formed. The drill is then withdrawn and the plunger inserted. The latter will fall into position by its own weight and thereafter reciprocate freely through the packing, in spite of which ease of movement an effective seal is provided, even at extremely high pressures.

The packing may be tightened at any time by turning the nut 33. Should the packing be too loose or worn a means for detecting leaks may be provided so that an attendant will know when to tighten the nut. A preferred form of such means is described later in connection with other figures. It will be observed that both the adjusting nut 33 and the adjusting bushing 27 are disposed in such manner as to be housed against tampering and outside influences. The upper end of the plunger is designed to actuate the movement M as the plunger moves up or down in response to fluid and spring pressures respectively, as follows:

A cap member 35 fits upon the upper end of the plunger and is locked thereon by a screw 36. This member is pivotally connected, as at 37, with an upright link 38 the upper end of which is pivoted upon a screw pin 39 projecting into a slot 41 formed in a toothed arm or segment 42. The segment 42 is pivoted, as at 43, to swing up and down between a pair of parallel frame plates 44 and 45 that are mounted in fixed position upon the back of the casing 12 by screw assemblies 46, 47 and 48. As the plunger reciprocates, it causes the segment to oscillate about its pivot. The pin 39 is slidable in the slot 41 and may be moved to any predetermined position therein to adjust the movement for accuracy after which the pin may be locked in such position against sliding movement.

The toothed arc of the segment is in meshing engagement with a small pinion 49 that is mounted upon and rotatable with a spindle 51. The latter is journaled in the frame plates 44 and 45 and has its outer end projecting through the dial 15 to swing an indicating pointer 52 over the scale on the dial face. It will be observed that the pointer may operate through a range of 360° since its actuating spindle is central of the casing. Only a slight angle of segment oscillation, corresponding to a plunger stroke of approximately $\frac{5}{16}$ inch, is sufficient to swing the pointer through a large angle. The angle of segment oscillation being small, and the link 38 acting normal to the axle of the segment and pinion at a point remote from the segment pivot, the readings are accurate because the errors due to angularity are minimized. The spring 26 is quite heavy particularly so when extremely high pressures are to be measured. Heavy pulsations and vibrations do not harm this spring or the rugged movement associated therewith.

A preferred embodiment of the invention is illustrated in Figures 3 and 4. In this form the instrument has been greatly shortened by projecting the greater portion of the pressure-responsive mechanism up into the casing. Another advantage of this modified arrangement is that the movement is supported entirely by the pressure-responsive mechanism and hence may be removed with the latter as a unit from the casing. In Figures 3 and 4, the lower portion of casing 12a is redesigned to provide, instead of the extension 18, a slot 53, flanked by a pair of supporting ledges 54 (see also Fig. 5). The housing sleeve 19a is modified to have a pair of supporting wings or legs 55 intermediate its ends so that the housing sleeve may be readily inserted sideways through the slot 53 into the casing to have the wings 55 supported upon the ledges 54. Screws 56 project through the casing 12 and into the wings 55 to lock the pressure-responsive mechanism firmly in position. The housing sleeve 19a is further modified to have an integral offset bracket 57. The frame plates 44 and 45 are inverted from their position in Figures 1 and 2 and the screw assemblies 47 serve to mount them upon the bracket 57, the other assemblies 46 and 48 merely serving to rigidly space the plates from each other.

Since the upper end of the plunger 24 and its cap 35 are now disposed well above the movement, a longer link 38a, downwardly suspended, is required for pivotally interconnecting the cap 35 with the oscillating segment 42. The gauge of Figures 3 and 4 provides a very compact and conveniently assembled instrument. It operates substantially in the same manner as that of Figures 1 and 2.

A vertical slot 58 is formed in the wall of the sleeve 19a adjacent the bottom of the spring chamber. A pin 59 projects through this slot into the collar 25 or any other convenient portion of the plunger 24. This prevents the plunger from turning as it reciprocates (the slot being long enough to permit full stroke of the plunger). The slot serves the further purpose of providing means for detecting leaks, since any fluid that gets past the packing will run through the slot and down the outer wall of the sleeve 19a and through an aperture formed in the casing wall below the slot as shown in the drawings. Fluid running down sleeve 19a within the casing may be detected by an observer through the space or clearance between the dial 15 and the casing wall, and fluid flowing down sleeve 19a outside of the casing may be of course detected directly. When this visible signal appears, an attendant may tighten the packing by turning the nut 33.

The instruments of Figures 5 to 10 inclusive are exactly like that of Figures 3 and 4 except that different types of movements and movement mountings are employed. In Figures 5 and 6 the movement mounted in casing 12b is a simple one of the rack and pinion type, comprising a rack 61, suspended at its upper end upon a screw bolt 62 carried by the cap 35 and having teeth 63 in mesh with a pinion 64. The latter is rotatably mounted on a spindle 65, supported by the sleeve 19b, and has an integral sleeve 66 to which a pointer 67 is secured by a fastening assembly 68. The rack is guided vertically and maintained in mesh with the pinion by a pair of horizontal bars 69 each of which is secured to a lug 71 on the sleeve 19 by a pair of spaced screws 72. In this form of gauge the segments are entirely eliminated and there is no angularity, and no lost motion or distortion of parts, as a result of which the readings are extremely accurate. The device is also very compact and of inexpensive, yet sturdy, construction.

In Figures 7 and 8 the movement in casing 12c comprises a pair of spaced plates 73 and 74 secured to the sleeve 19c by screws 75 and 76, a segment or gear 77 pivoted between the plates on a horizontal pin 78, and a rotatable pinion 79 in mesh with the segmental gear. The latter has a short radial extension 81 to which the link 38c is connected. The pinion is centrally mounted, as at 82, to actuate the pointer 67. In this form the segment moves through a relatively large arc, as indicated on the drawings.

All gearing is eliminated in the gauge of Figures 9 and 10. In this form the actuating link 38d is pivotally suspended as at 37, and at its lower end is pivotally connected to one end of an arm or lever 83, as at 84. The lever 83 is pivoted intermediate its ends upon a pin 85 that is screwed into an integral extension arm 86 of the housing sleeve 19d in casing 12d. The lever has a bifurcated end 87 which slidably receives a crank pin 88 carried by a crank 89. The pin 88 is slidable in a slot 90 in the crank and may be locked in any one of a plurality of positions in order to adjust the movement for accuracy. Slot 90 thus corresponds with slot 41 of the other figures. The crank is fixed upon a spindle 91 which is rotatably journaled in the outer end of the extension arm 86. The spindle projects through the dial 15 and has a pointer 92 secured thereto for oscillation therewith by means of a fastening assembly 93. Since the pointer is not concentrically pivoted as in the other forms, the scale will, of course, be disposed across the face of the dial (as indicated by phantom lines) instead of around its periphery. The operation of this movement is thought to be obvious from the foregoing disclosure. Its action is very smooth and its readings quite accurate.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:—

1. In a pressure gauge, in combination, a casing; pressure indicating means including a movable pointer; a movement within said casing for actuating said pointer; and a pressure-responsive device for operating said movement, said device comprising a housing and a plunger reciprocable therein, means interconnecting said plunger and said movement, and means for connecting said housing with a fluid source to expose one end of said plunger to fluid pressure, and means for preventing fluid from leaking axially of said plunger, said means comprising at least one packing device consisting of a metallic ring and a non-metallic disc arranged within said housing in superposed relation and closely surrounding said plunger to form a substantially smooth continuous packing bore.

2. In the apparatus defined in claim 1 said ring having a central annular recess adjacent said disc, and said disc having its inner edge offset into said recess to engage the cylindrical surface of the plunger.

3. In the apparatus defined in claim 1, a packing nut for forcing said one or more packing devices axially of said plunger into firm engagement with a portion of said housing, said nut being adjustably screwed into the interior of said housing.

4. In a pressure gauge, in combination, a casing; pressure indicating means including a movable pointer; a movement within said casing for actuating said pointer; a pressure-responsive device for operating said movement, said device comprising a housing and a plunger reciprocable therein; means interconnecting said plunger and said movement; means for connecting said housing with a fluid source to expose one end of said plunger to fluid pressure; and means for preventing fluid from leaking axially of said plunger, said means comprising a series of alternately arranged apertured metallic rings and non-metallic disks in said housing and closely surrounding said plunger to define a substantially smooth continuous packing bore.

5. In the apparatus defined in claim 4, each of said rings being formed with a central annular recess on one surface and said disks being provided with offset inner portions to engage said recesses.

6. In a gauge construction, a substantially cup shaped casing; a movement and indicating means disposed within said casing; a unitary housing having a portion to be received in said casing; a pressure responsive mechanism mounted within said unitary housing and operating independently of said casing; a slot in the rim of said casing whereby said unitary housing may be readily inserted laterally into said casing through said slot; and means including means carried by said housing, for locking said portion in its inserted position; said pressure responsive mechanism comprising a plunger and a pressure reaction spring surrounding a portion of the plunger; means within said casing for adjusting said spring for variations in reactive pressure, whereby said spring adjusting means is housed against tampering and outside influence.

7. In a pressure responsive gauge; a casing; a movement and indicating means disposed in said casing; a housing projecting into and anchored upon said casing and provided with an offset bracket; a pressure responsive plunger mounted for reciprocation in said housing and projecting outwardly therefrom into said casing but operating entirely independently of said casing for actuating said movement; a coil spring arranged in said housing and surrounding a portion of said plunger; said housing being provided with an adjustable element arranged interiorly of said casing and surrounding the plunger to guide the latter, said element being screwed into the housing to provide a shiftable abutment for the inner end of said spring; a substantially L-shaped cap having connection with the projecting end of said plunger; a movement comprising a pair of substantially parallel members rigidly secured together in spaced relationship and mounted on said offset housing bracket, a spindle journaled in said spaced members, a toothed segment having a pivotal connection therewith for oscillation between said spaced members, a second spindle journaled in said spaced members having a pinion rotatably mounted thereon, said pinion being intermeshed with the toothed arc of said segment; a link having a connection at one end thereof with said L-shaped cap and having a connection at its other end with said segment; means for connecting said plunger with a source of fluid pressure for actuating said plunger; and means for preventing fluid from leaking axially of said plunger.

8. A pressure gauge comprising a casing, pressure indicating means disposed within said casing, a movement operatively connected to said means, a socket member including a sleeve the upper end of which projects into said casing, said sleeve being imperforate from the lower end thereof to said casing, means for connecting the lower end of said sleeve with a fluid source, a plunger designed to reciprocate in said sleeve and having a stem projecting upwardly through said sleeve into cooperation with said movement, an opening in said upper end of said sleeve for allowing passage into said casing of fluid leaking past said plunger, and an aperture in the bottom of said casing to the front of said sleeve to permit said last named fluid to drain from said casing and be betrayed to an observer reading the gauge.

MAXIMILIAN KLEIN.
REIDER A. TOLLEFSEN.